H. WADSWORTH.
Extension-Key.

No. 203,223.  Patented April 30, 1878.

UNITED STATES PATENT OFFICE.

HERBERT WADSWORTH, OF HOHOKUS, NEW JERSEY, ASSIGNOR TO WILLIAM H. ROCKWELL, OF NEW YORK CITY.

IMPROVEMENT IN EXTENSION-KEYS.

Specification forming part of Letters Patent No. 203,223, dated April 30, 1878; application filed February 7, 1878.

*To all whom it may concern:*

Be it known that I, HERBERT WADSWORTH, of Hohokus, in the county of Bergen and State of New Jersey, have invented a new and useful Improvement in Extension-Keys; and I do hereby declare that the following is a full and exact description of the same, reference being had to the accompanying drawings, and to the letters of reference marked thereon.

My invention relates to the construction of extension-keys, especially designed for use upon doors which slide into a casing, so that one size of key can be adjusted to various thicknesses of doors; and the object I have in view is to make such a key so that it can be more conveniently adjusted, and will not require the escutcheons to be defaced, as when a set-screw is tapped through the side of the hollow shank, to hold the stem in the desired position. This I effect by placing a screw in the hollow shank, with a head projecting beyond the end of the same, and by tapping out the stem to work upon such screw, so that by turning the head of the screw the stem will be moved into or out of the hollow shank, and the key adjusted to the required length.

Figure 1:
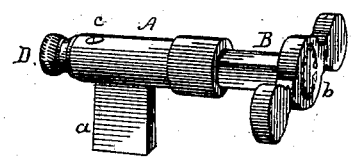
Figure 2:
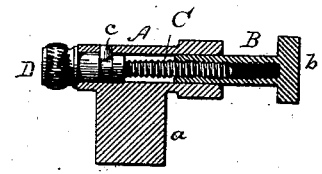

In the drawings, Figure 1 is a perspective view of the key, and Fig. 2 a central longitudinal section of the same.

A represents the shank of the key, carrying the web $a$; and B, the stem, having the cross-bar or handle $b$, by which the key is turned. The shank is made hollow throughout its entire length, and within it is placed a screw, C, of about the same length as the shank. This screw is held within the shank by a small pin, $c$, which allows the screw to turn freely, but prevents any longitudinal movement of the same.

The screw C has a head, D, which forms an extension of the shank A, and may be roughened to permit it to be easily grasped by the fingers for the purpose of turning the screw.

The stem B may be made of any desired form, an angular form being preferred, so as to keep the stem from turning in the shank, and the interior of the shank is made of the same shape as the stem, the parts fitting closely together.

The stem B is bored out longitudinally, and cut with a female screw-thread of the required pitch to receive the screw C.

To adjust the length of the key, the head of the screw is turned, and the stem is either drawn into or moved out of the hollow shank, and after the key has been once fitted to a door it will always retain the same length, and can only be changed in length by withdrawing the key from the lock and turning the screw. By these means the sides of the shank are left without any projections, and the opening in the escutcheon does not have to be enlarged, or the escutcheon in any other manner defaced, to adapt it for use with my key.

What I claim as my invention, and desire to secure by Letters Patent, is—

1. In an extension-key made in two parts, the screw C, for adjusting the length of the key, substantially as described.

2. In a key, the combination of the shank and stem, adapted to slide one upon the other, with the screw C, having head D, substantially as and for the purposes set forth.

This specification signed and witnessed this 1st day of February, 1878.

HERBERT WADSWORTH.

Witnesses:
 L. W. SEELY,
 R. N. DYER.